United States Patent

Benicewicz et al.

[11] Patent Number: 5,575,949
[45] Date of Patent: Nov. 19, 1996

[54] THERMOSET MOLECULAR COMPOSITES

[75] Inventors: Brian C. Benicewicz; Elliot P. Douglas; Rex P. Hjelm, Jr., all of Los Alamos, N.M.

[73] Assignee: The Regents of the University of California, Office of Technology Transfer, Alameda, Calif.

[21] Appl. No.: 254,081

[22] Filed: Jun. 2, 1994

[51] Int. Cl.⁶ .................................................. C09K 19/52
[52] U.S. Cl. .......................................... 252/299.01
[58] Field of Search ............................ 252/299.01; 428/1

[56] References Cited

U.S. PATENT DOCUMENTS

| | | | |
|---|---|---|---|
| 4,869,847 | 9/1989 | Leslie et al. | 252/299.01 |
| 4,994,204 | 2/1991 | Doane et al. | 252/299.01 |
| 5,084,203 | 8/1992 | Sansone et al. | 252/299.5 |
| 5,114,612 | 5/1992 | Benicewicz et al. | 252/299.01 |
| 5,198,551 | 3/1993 | Benicewicz et al. | 548/435 |
| 5,211,876 | 5/1993 | Vaz et al. | 252/299.01 |
| 5,378,391 | 1/1995 | Nakatani et al. | 252/299.01 |
| 5,385,690 | 1/1995 | Finkelmann et al. | 252/299.01 |

*Primary Examiner*—Philip Tucker
*Attorney, Agent, or Firm*—Bruce H. Cottrell

[57] ABSTRACT

A polymeric composition including a liquid crystalline polymer and a thermosettable liquid crystalline monomer matrix, said polymeric composition characterized by a phase separation on the scale of less than about 500 Angstroms and a polymeric composition including a liquid crystalline polymer and a liquid crystalline thermoset matrix, said polymeric composition characterized by a phase separation on the scale of less than about 500 Angstroms are disclosed.

10 Claims, No Drawings

THERMOSET MOLECULAR COMPOSITES

FIELD OF THE INVENTION

The present invention relates to field of molecular composites and more particularly to molecular composites including both a liquid crystalline polymer and a liquid crystalline thermoset matrix, or both a liquid crystalline polymer and a thermosettable liquid crystalline monomer. This invention is the result of a contract with the Department of Energy (Contract No. W-7405-ENG-36).

BACKGROUND OF THE INVENTION

There is a great deal of interest in the concept of molecular composites due to the large increases in mechanical properties which may be realized from this type of composite material (see, e.g., U.S. Pat. No. 4,207,407 and Hwang et al., J. Macromol. Sci.—Phys., vol. B22, No. 2, pp. 231–257 (1983)). Fiber composite theory predicts that reinforcement of a matrix is controlled by the aspect ratio of the reinforcing element. Increasing the aspect ratio of the fiber is reported to increase tensile modulus by up to two orders of magnitude. Thus, the expected property improvements in molecular composites result from the reinforcement of a matrix at the molecular level by individually dispersed rigid rod polymer molecules. In addition, the formation of a molecular composite may alleviate the problem in conventional composites of failure at discrete phase separated fiber-matrix interfaces.

A recent review by Pawlikowski et al., Annu. Rev. Mater. Sci., Vol. 21, pp. 159–184 (1991), summarizes the current status of polymer molecular composites. Most of the work on molecular composites has focused on two reinforcements, poly (p-phenyleneterephthalamide) (PPTA), and the PBZ's, either poly (p-phenylenebenzobisthiazole) or poly-(benzimidazole). Thermoplastic and thermoset matrices have both been explored. In general, the major obstacle to overcome in the formation of a true molecular dispersion is the immiscibility of the rigid reinforcement and flexible matrix polymers which leads to phase separation between the components. Such phase separation generally leads to the scattering of light whereby samples appear opaque and are not optically transparent.

It is an object of the present invention to provide a homogeneous molecular composite.

Another object of the present invention is to provide a homogeneous molecular composite including a liquid crystalline polymer and a liquid crystalline thermoset matrix.

Yet another object of the present invention is to provide a homogeneous molecular composite including a liquid crystalline polymer and a thermosettable liquid crystalline monomer.

Still another object of this invention is to provide a molecular composite including a liquid crystalline polymer and a liquid crystalline thermoset matrix having enhanced miscibility.

Still another object of this invention is to provide a molecular composite including a liquid crystalline polymer and a thermosettable liquid crystalline monomer having enhanced miscibility.

SUMMARY OF THE INVENTION

To achieve the foregoing and other objects, and in accordance with the purposes of the present invention, as embodied and broadly described herein, the present invention provides a polymeric composition including a liquid crystalline polymer and a thermosettable liquid crystalline monomer, said polymeric composition characterized by a phase separation between liquid crystalline polymer and thermosettable liquid crystalline monomer phases of on the scale of less than about 500 Angstroms.

The present invention also provides a polymeric composition including a liquid crystalline polymer and a liquid crystalline thermoset matrix, said polymeric composition characterized by a phase separation between liquid crystalline polymer and liquid crystalline thermoset matrix phases of on the scale of less than about 500 Angstroms.

In one embodiment, the present invention provides a polymeric composition including a mixture of poly(paraphenylene-2-nitroterephthalamide) as the liquid crystalline polymer and 2,2'-dimethylbiphenyl bismaleimide amide monomer as the thermosettable liquid crystalline monomer.

In another embodiment, the present invention provides a polymeric composition including a mixture of poly(paraphenylene-2-nitroterephthalamide) as the liquid crystalline polymer and polymerized 2,2'-dimethylbiphenyl bismaleimide amide monomer as the liquid crystalline thermoset matrix.

DETAILED DESCRIPTION

The present invention concerns a new approach to molecular composites. This approach uses a mixture of a liquid crystalline polymer (LCP) reinforcement in a liquid crystalline thermoset (LCT) matrix. Composites made from LCP's and LCT's can show enhanced miscibility as a consequence of both components' ability to form liquid crystalline phases. Initially, a mixture of a liquid crystalline polymer (LCP) reinforcement in a thermosettable liquid crystalline monomer is formed as an intermediate product. Subsequent crosslinking of the thermosettable monomer, e.g., by heating at from about 150° C. to about 300° C., can then result in a homogeneous dispersion of rigid-rod polymer within a continuous three dimensional crosslinked matrix or network.

A large number of liquid crystalline thermosets (LCT's), i.e., bifunctional rigid-rod molecules that form a liquid crystalline phase and crosslink with retention of the liquid crystalline order, may be used in the molecular composites of the present invention. The resultant mixture of a LCP and a LCT can be analyzed using small angle neutron scattering (SANS) to determine the level of miscibility. Lack of miscibility is also readily apparent by mixtures that do not remain optically clear. Molecular composites that remain optically clear indicate phase separated materials of less than approximately 4000 Angstroms in dimension.

The liquid crystalline thermoset matrix can be formed from thermosettable liquid crystalline monomers, such monomers generally being difunctional rigid rod molecules or monomers endcapped with crosslinking functionalities such as acetylinic, e.g., acetylene, substituted acetylene and the like, ethylenic, e.g., acrylates, methacrylates or vinyl ethers, cyanate, isocyanate, nadimide, substituted nadimide, maleimide, epoxy and the like. Among the suitable thermosettable liquid crystalline monomers are those described in U.S. Pat. No. 5,114,612 and U.S. Pat. No. 5,198,551, such disclosure of liquid crystalline polyester monomers or liquid crystalline polyamide monomers and the resultant liquid crystalline thermosets is incorporated herein by reference. Liquid crystalline polyamide monomers can be selected from materials represented by the formula: $R^1$—$A^1$—$B^1$—

$A^2$—$B^2$—$A^3$—$R^2$ where $R^1$ and $R^2$ are radicals selected from the group consisting of maldeimide, nadimide, substituted nadimide, ethynyl, and $(C(R^3)_2)_2$ where $R^3$ is hydrogen with the proviso that the two carbon atoms of $(C(R^3)_2)_2$ are bound on the aromatic ring of $A^1$ or $A^3$ to adjacent carbon atoms, $A^1$ and $A^3$ are 1,4-phenylene and the same where said group contains one or more substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like, $A^2$ is selected from the group consisting of 1,4-phenylene, 4,4'-biphenyl, 2,6-naphthalene and the same where said groups contain one or more substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like, and $B^1$ and $B^2$ are selected from the group consisting of —C(O)—N(H)—, or —N(H)—C(O)—. Among the suitable liquid crystalline amide monomers are 2,2'-dimethylbiphenyl bisnadimide amide monomer, 2,2'-dimethylbiphenyl bis(methylnadimide) amide monomer, and 2,2'-bis(trifluoromethyl)biphenyl bis(methylnadimide) amide monomer.

Thermosettable liquid crystalline polyester monomers can be selected from materials represented by the formula: $R^{11}$—$A^{11}$—$B^{11}$—$A^{12}$—$B^{12}$—$A^{13}$—$R^{12}$ where $R^{11}$ and $R^{12}$ are radicals selected from the group consisting of maldeimide, nadimide, substituted nadimide, ethynyl, and $(C(R^{13})_2)_2$ where $R^{13}$ is hydrogen with the proviso that the two carbon atoms of $(C(R^{13})_2)_2$ are bound on the aromatic ring of $A^{11}$ or $A^{13}$ to adjacent carbon atoms, $A^{11}$ and $A^{13}$ are 1,4-phenylene and the same where said group contains one or more substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like, $A^{12}$ is selected from the group consisting of 1,4-phenylene, 4,4'-biphenyl, 2,6-naphthalene and the same where said groups contain one or more substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, fluoroalkyl or fluoroalkoxy, e.g., trifluoroalkyl, pentafluoroethyl and the like, and phenyl, and $B^{11}$ and $B^{12}$ are selected from the group consisting of —C(O)—O—, or —O—C(O)—. Among the preferred liquid crystalline ester monomers are those wherein $R^{11}$ and $R^{12}$ are radicals selected from the group consisting of maldeimide, nadimide, substituted nadimide, ethynyl, and $(C(R^{13})_2)_2$, $A^{11}$ and $A^{13}$ are 1,4-phenylene, $B^{11}$ and $B^{12}$ are —C(O)—O— and —O—C(O)— respectively, and $A^{12}$ is 1,4-phenylene.

A large number of liquid crystalline polymers (LCP's) can be employed with the LCT's in the present invention. For example, the LCP's generally have a rigid rodlike backbone such as an aromatic group or the like. Among such materials are those consisting of one or more of the following materials A:

—C(=O)—$C_6H_4$—C(=O)-(para orientation); —C(=O)—$C_6H_3R$—$C_6H_3R$—C(=O)—; —C(=O)—$C_{10}H_6$—C(=O)—; —C(=O)—$(CH_2)_n$—C(=O)— where n is 1-15; and —C(=O)—$C_6R_1R_2R_3R_4$—C(=O)—, where R and $R_n$ can be substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like, plus one or more of the following materials B: —O—$C_6H_4$—O— (para orientation); —O—$C_6H_3R$—$C_6H_3R$—O—; —O—$C_{10}H_6$—O—; —O—$(CH_2)_n$—O— where n is 1-15; and —O—$C_6R_1R_2R_3R_4$—O—, where R and $R_n$ can be substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like. Additionally materials wherein B is —N(H)—X—N(H)— and A is —C(=O)—X—C(=O)—, wherein A is —C(=O)N(H)—X—N(H)C(=O)— and B is —O—X—O—, wherein A is —C(=O)O—X—OC(=O)— and B is —O—X—O—, wherein A is —C(=O)—X—C(=O)— and B is —X—, wherein A is —S(=O)$_2$—X—S(=O)$_2$— and B is —X—, wherein A is —C(=O)—X— and B is —X—, and wherein A is —S(=O)$_2$—X— and B is —X— wherein X is —$C_6H_4$—; —$C_6H_3R$—$C_6H_3R$—; —$C_{10}H_6$—; —$(CH_2)_n$— where n is 1-15; and —$C_6R_1R_2R_3R_4$—, where R and $R_n$ can be substituents selected from the group consisting of halo, e.g., fluoro, chloro, bromo or iodo, nitro, lower alkyl, e.g., methyl, ethyl or propyl, lower alkoxy, e.g., methoxy, ethoxy or propoxy, and fluoroalkyl or fluoroalkoxy, e.g., trifluoroalkyl, pentafluoroethyl and the like, can be used as the liquid crystalline polymer. Rod-like aromatic heterocyclic polymers useful as the liquid crystalline polymer can include, e.g., poly(p-phenylene benzobisthiazole), poly(p-phenylene benzobisoxazole) and poly(p-phenylene benzimidazole). Preferred LCP's generally include aromatic polyamides, aromatic polyesters, and rod-like aromatic heterocyclic polymers.

The polymer blends of LCP and LCT can be formed, e.g., by solution casting or may be formed by melt blending depending upon the melting points of the respective materials. In solution casting, e.g., the respective materials can be dissolved in an appropriate solvent such as N-methylpyrrolidinone at suitable weight percentages limited only by the resulting viscosity of the solution and the solubility of the polymer or monomer, and the solutions mixed and cast into the desired shape such as a film, a fiber and the like. Often, solution casting will be conducted with solutions of about 5% by weight solids.

The ratio of LCP to LCT can generally be anywhere within the range of from about 99% by weight LCP to about 1% by weight LCT to about 1% by weight LCP to about 99% by weight LCT, more preferably from about 20% LCP by weight to about 80% by weight LCT to about 80% by weight LCP to about 20% by weight LCT. The particular ratio of LCP to LCT will be dependent upon the intended application.

The present invention is more particularly described in the following examples which are intended as illustrative only, since numerous modifications and variations will be apparent to those skilled in the art.

EXAMPLE 1

2,2'-dimethylbiphenyl bismaleimide amide monomer forms isotropic solutions in N-methyl-2-pyrrolidinone (NMP) up to a concentration of about 30 weight percent. However, nematic textures were observed in films when 5 weight percent solutions were subjected to the drying conditions described below. Poly(p-phenylene-2-nitroterephthalamide) (PNTA) was prepared following the general phosphorylation procedure described by Higashi et al., J. Polym. Sci.: Polym. Chem. Ed., Vol. 20, pp. 2081–2087 (1982). Deuterated p-phenylene diamine was obtained from MSD Isotopes and vacuum sublimed at 120° C. directly before use in the polymerizations. Solution and film compositions are described herein as weight/weight percent ratios. Solutions of the mixtures were made by dissolving the 60% LCP and 40% LCT in NMP at a total concentration of approximately 5 weight percent. The isotropic solutions were cast onto glass plates and allowed to air dry for 24 hours, followed by oven drying at 60° C. The films were then dried in vacuum at 150° C. overnight. The resultant dried films were optically clear indicating the mixture remained essentially homogeneous, i.e., phase separation was minimal. Small-angle neutron scattering measurements were conducted and showed mixed phases of the LCT and LCP roughly 80 Angstroms in size.

In examples 2–7, one composition was prepared with 60 weight percent LCP and 40 weight percent LCT and one composition was prepared with 80 weight percent LCP and 20 weight percent LCT.

EXAMPLE 2

2,2'-dimethylbiphenyl bismaleimide amide monomer and poly(p-phenylene-2-nitroterephthalamide) solutions in NMP of approximately 5 weight percent were mixed as in Example 1. The isotropic solutions were cast onto glass plates and allowed to air dry for 24 hours, followed by oven drying at 100° C. The films were then dried in vacuum at 150° C. overnight. The resultant dried films were optically clear indicating the mixture remained essentially homogeneous, i.e., phase separation was minimal.

EXAMPLE 3

2,2'-dimethylbiphenyl bis(methylnadimide) amide monomer and poly(p-phenylene-2-nitroterephthalamide) solutions in NMP of approximately 5 weight percent were mixed as in Example 1. The isotropic solutions were cast onto glass plates and allowed to air dry for 24 hours, followed by oven drying at 60° C. The films were then dried in vacuum at 150° C. overnight. The resultant dried films were optically clear indicating the mixture remained essentially homogeneous, i.e., phase separation was minimal.

EXAMPLE 4

2,2'-dimethylbiphenyl bis(methylnadimide) amide monomer and poly(p-phenylene-2-nitroterephthalamide) solutions in NMP of approximately 5 weight percent were mixed as in Example 3. The isotropic solutions were cast onto glass plates and allowed to air dry for 24 hours, followed by oven drying at 100° C. The films were then dried in vacuum at 150° C. overnight. The resultant dried films were optically clear indicating the mixture remained essentially homogeneous, i.e., phase separation was minimal.

EXAMPLE 5

2,2'-bis(trifluoromethyl)biphenyl bis(methylnadimide) amide monomer and poly(p-phenylene-2-nitroterephthalamide) solutions in NMP of approximately 5 weight percent were mixed as in Example 1. The isotropic solutions were cast onto glass plates and allowed to air dry for 24 hours, followed by oven drying at 60° C. The films were then dried in vacuum at 150° C. overnight. The resultant dried films were optically clear indicating the mixture remained essentially homogeneous, i.e., phase separation was minimal.

EXAMPLE 6

2,2'-bis(trifluoromethyl)biphenyl bis(methylnadimide) amide monomer and poly(p-phenylene-2-nitroterephthalamide) solutions in NMP of approximately 5 weight percent were mixed as in Example 3. The isotropic solutions were cast onto glass plates and allowed to air dry for 24 hours, followed by oven drying at 100° C. The films were then dried in vacuum at 150° C. overnight. The resultant dried films were optically clear indicating the mixture remained essentially homogeneous, i.e., phase separation was minimal.

EXAMPLE 7

Chlorohydroquinone bis(maleimide) ester monomer (i.e., $Y-C_6H_4-C(=O)-C_6H_3Cl-O-C(=O)-C_6H_4-Y$ where Y is maleimide) and poly(2-t-butylphenylene-2-(2-phenylethyl)terephthalate) solutions in NMP of approximately 5 weight percent were mixed as in Example 1. The isotropic solutions were cast onto glass plates and allowed to air dry for 24 hours, followed by oven drying at 100° C. The films were then dried in vacuum at 150° C. overnight. The resultant dried films were optically clear indicating the mixture remained essentially homogeneous, i.e., phase separation was minimal.

The results of the examples demonstrate that homogeneous molecular composites can be prepared from mixtures of liquid crystalline polymers (LCP's) and liquid crystalline thermosets (LCT's), such molecular composites exhibiting optical clarity thus indicating minimal phase separation.

Although the present invention has been described with reference to specific details, it is not intended that such details should be regarded as limitations upon the scope of the invention, except as and to the extent that they are included in the accompanying claims.

What is claimed is:

1. A polymeric composition comprising a liquid crystalline polymer selected from the group consisting of aromatic polyamides, aromatic polyesters, polybenzobisthiazoles, polybenzobisoxazoles, and polybenzimidazoles and a thermosettable liquid crystalline monomer selected from the group consisting of rigid rod monomers including difunctionality selected from the group consisting of bis-epoxy, bis-acetylene, bis-maleimide, bis-nadimine, bis-acrylate, bis-methacrylate, bis-isocyanate, bis-cyanate, and bis-vinyl ether, said polymeric composition characterized by a phase separation between liquid crystalline polymer and thermosettable liquid crystalline monomer phases of less than about 500 Angstroms.

2. The polymeric composition of claim 1 including a mixture of poly(para-phenylene-2-nitroterephthalamide) as the liquid crystalline polymer and 2,2'-dimethylbiphenyl bismaleimide amide monomer as the thermosettable liquid crystalline monomer.

3. The polymeric composition of claim 1 including a mixture of poly(para-phenylene-2-nitroterephthalamide) as the liquid crystalline polymer and 2,2'-dimethylbiphenyl bis(methylnadimide) amide monomer as the thermosettable liquid crystalline monomer.

4. The polymeric composition of claim 1 including a mixture of poly(para-phenylene-2-nitroterephthalamide) as the liquid crystalline polymer and 2,2'-bis(trifluoromethyl)biphenyl bis(methylnadimide) amide monomer as the thermosettable liquid crystalline monomer.

5. The polymeric composition of claim 1 including a mixture of poly(2-t-butylphenylene-2-(2-phenylethyl- )terephthalate) as the liquid crystalline polymer and chlorohydroquinone bis(maleimide) ester monomer as the thermosettable liquid crystalline monomer.

6. A polymeric composition comprising a liquid crystalline polymer selected from the group consisting of aromatic polyamides, aromatic polyesters, polybenzobisthiazoles, polybenzobisoxazoles, and polybenzimidazoles and a liquid crystalline thermoset matrix formed from rigid rod monomers including difunctionality selected from the group consisting of bis-epoxy, bis-acetylene, bis-maleimide, bis-nadimine, bis-acrylate, bis-methacrylate, bis-isocyanate, bis-cyanate, and bis-vinyl ether, said polymeric composition characterized by a phase separation between liquid crystalline polymer and liquid crystalline thermoset matrix phases of less than about 500 Angstroms.

7. The polymeric composition of claim 6 including a mixture of poly(para-phenylene-2-nitroterephthalamide) as the liquid crystalline polymer and polymerized 2,2'-dimethylbiphenyl bismaleimide amide monomer as the liquid crystalline thermoset matrix.

8. The polymeric composition of claim 6 including a mixture of poly(para-phenylene-2-nitroterephthalamide) as the liquid crystalline polymer and polymerized 2,2'-dimethylbiphenyl bis(methylnadimide) amide monomer as the liquid crystalline thermoset matrix.

9. The polymeric composition of claim 6 including a mixture of poly(para-phenylene-2-nitroterephthalamide) as the liquid crystalline polymer and polymerized 2,2'-bis(trifluoromethyl)biphenyl bis(methylnadimide) amide monomer as the liquid crystalline thermoset matrix.

10. The polymeric composition of claim 6 including a mixture of poly(2-t-butylphenylene-2-(2-phenylethyl)terephthalate) as the liquid crystalline polymer and polymerized chlorohydroquinone bis(maleimide) ester monomer as the liquid crystalline thermoset matrix.

* * * * *